April 8, 1930.  H. W. VAN DER PLOEG  1,754,133
CHANGE-OVER MECHANISM
Filed Aug. 28, 1928

H. W. van der Ploeg
INVENTOR

By Marks & Clerk
Attys.

Patented Apr. 8, 1930

1,754,133

UNITED STATES PATENT OFFICE

HIDDE WIBIUS van der PLOEG, OF APELDOORN, NETHERLANDS

CHANGE-OVER MECHANISM

Application filed August 28, 1928, Serial No. 302,541, and in the Netherlands July 12, 1926.

My present invention for which I have filed application in Netherlands, July 12, 1926, relates to change-over mechanism as used, inter alia, in machine-tools and dairy machinery for selectively coupling a primary shaft with secondary shafts in such a manner that one only of said secondary shafts is driven and the others remain stationary. Such mechanism is also applicable to motor cars, the motor of which has to drive a pump (motor fire-engine), a belt pulley, a winch or the like.

The object of my present invention is to provide a change-over mechanism, by means of which the selected secondary shaft can be reliably coupled with the primary shaft with the least possible loss of time.

In accordance with my present invention, the mechanism comprises an intermediate shaft having at one end a universal coupling for the driving shaft and bearing in a supporting member by means of which it can be moved both axially and circumferentially in such a manner that its other end is adapted, by axial displacement, to be released from a fixed driven shaft in alignment therewith and, by a circumferential displacement followed by an axial movement, to be directly coupled with another driven shaft.

The annexed drawing illustrates, by way of example only, two embodiments of my present invention.

Figure 1:
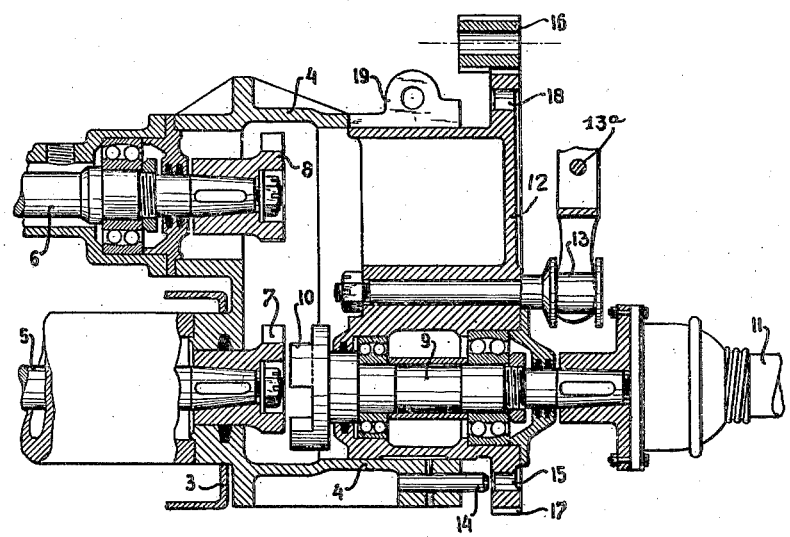
Fig. 1 is an axial sectional view of the first embodiment.

In Fig. 1, the beam 3 forms part of the frame of a motor car. Secured to this beam is a casing 4, part of which forms a bearing for a shaft 5, the latter being connected with a fixed differential gear acting, through two short shafts, on the rear wheels of a motor car (not shown).

The device shown in this figure can, however, be used with equal advantage in connection, for instance, with a milling-machine or a universal machine-tool, in which selectively one of a pair of shafts or of a number of shafts, is to be driven.

The casing 4 has another bearing for a second fixed shaft 6, which, for instance, may be connected with a pump. Shafts 5 and 6 are each provided with a clutch member 7 and 8, respectively, in alignment with shaft 5 is an intermediate shaft 9, which is provided with a mating clutch member 10 and connected with the shaft 11 driven by the change speed gear (not shown). Said intermediate shaft 9 has its bearings in a member 12 fitting within a cylindrical portion of the casing 4 and adapted for sliding and for rotary motion therein. Secured to member 12 is a central bolt 13 provided with collars adapted to be engaged by a bifurcated lever 13ª, by means of which it can be moved axially in either direction. When said member 12 is pushed inward, i. e. to the left, a pin 14 secured to the casing 4 enters into a registering hole 15 in member 12, clutch member 10 engages clutch member 7, and the shaft 11 is telescoped. Shaft 5 is then indirectly coupled with the motor. Alternatively member 12 may first be rotated by means of a pinion 16 cooperating with a toothed rim 17 of member 12, until shaft 9 aligns with shaft 6, and thereafter said member 12 may be pushed axially inward, i. e. to the left, by the lever 13ª whereby clutch members 10 and 8 engage each other and shaft 6 is operatively coupled with the motor. In this case, pin 14 engages a hole 18 in member 12.

The lugs 19 on either side of an axial cut in the cylindrical portion of casing 4 serve to receive a screw, whereby member 12 can firmly be clamped in said casing, when desired.

Figure 2:
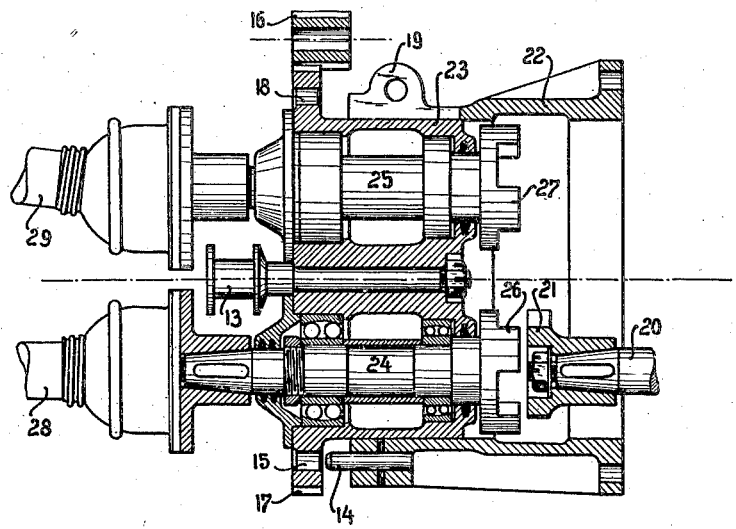
Fig. 2 is a sectional view, along a broken plane passing through the axis, of the second embodiment.

According to Fig. 2, shaft 20, i. e. the driven shaft of the change speed gear of a motor car, is provided with a clutch member 21 and supported in a fixed bearing of casing 22, which is secured to the motor car frame and encloses the slidable and rotatable member 23 having bearings for two intermediate shafts 24, 25, fitted with clutch members 26 and 27, respectively. Coupled to said intermediate shafts, through universal joints, are the shafts 28 and 29. The central bolt 13, the locking pin 14, the holes 15 and 18, the pinion 16 and the toothed rim 17 are the equivalents of the parts designated by the same reference numerals in Fig. 1. When member 23 is axially moved inwards, i. e. to the right, clutch members 21 and 26 engage each other, whereby the shaft 28 is driven and the driving wheels of the motor car (not shown) are rotated. If, however, member 23 is first rotated until shaft 25 is in alignment with shaft 20, then an axial displacement of member 23 results in the coupling of shaft 20 with the shaft 29 which, for instance, drives the pump. It will be understood, that the angular distance between shafts 24 and 25 should be such that the parts associated with said shafts do not impair the required freedom of motion of the bifurcated lever engaging bolt 13.

I am aware that it has already been proposed to provide for gear wheels behind the ordinary change speed gear, for the purpose of driving an auxiliary shaft. As compared with these known constructions, my present device has the advantage not to comprise any gear wheel in the transmission proper, i. e. of providing for a direct drive owing to the fact that an intermediate shaft, having a universal joint with a driving or a driven shaft, is adapted for both axial and circumferential movement so that it can be brought into alignment with the fixed shaft, with which it is to be coupled.

What I claim is:—

1. In a change-over mechanism, a stationary support, a member mounted to rotate bodily and move axially in said support, an intermediate shaft rotatably mounted in said member and disposed eccentrically relative to the axis of rotation of the latter, a driving shaft, and a plurality of driven shafts, and clutch members connected with certain of the shafts and adapted incident to rotary and axial movement of said member to selectively couple the drive shaft with either of the driven shafts.

2. In a change-over mechanism, a stationary support, a member mounted to rotate bodily and move axially in said support, an intermediate shaft rotatably mounted in said member and disposed eccentrically relative to the axis of rotation of the latter, a driving shaft, and a plurality of driven shafts, and clutch members connected with certain of the shafts and adapted incident to rotary and axial movement of said member to selectively couple the drive shaft with either of the driven shafts, the driven shafts being rotatably mounted in the stationary support and the drive shaft being coupled with the intermediate shaft for movement with the latter and the rotatable member.

3. In a change-over mechanism, a stationary support, a member mounted to rotate bodily and move axially in said support, an intermediate shaft rotatably mounted in said member and disposed eccentrically relative to the axis of rotation of the latter, a driving shaft, and a plurality of driven shafts, and clutch members connected with certain of the shafts and adapted incident to rotary and axial movement of said member to selectively couple the drive shaft with either of the driven shafts, said rotatable member having perforations therein and a pin carried by the stationary support adapted to be received in one of said perforations to lock the rotary member in angular adjustment relative to the stationary support.

In testimony whereof I affix my signature.

HIDDE WIBIUS van der PLOEG.